C. G. RIGGS.
Milk-Coolers.

No. 196,829. Patented Nov. 6, 1877.

Attest:
F. S. Budd
W. R. Richard

Inventor:
Charles G. Riggs

UNITED STATES PATENT OFFICE.

CHARLES G. RIGGS, OF TURIN, NEW YORK.

IMPROVEMENT IN MILK-COOLERS.

Specification forming part of Letters Patent No. 196,829, dated November 6, 1877; application filed July 5, 1877.

*To all whom it may concern:*

Be it known that I, CHARLES G. RIGGS, of Turin, in the county of Lewis and State of New York, have invented a new and useful Improvement in Apparatus for Cooling Milk, to be used in connection with the ordinary transportation-can used by the dairyman in conveying the milk to the factory or creamery, which improvement is fully shown and described in the following specification and the accompanying drawings, in which—

Figure 1:
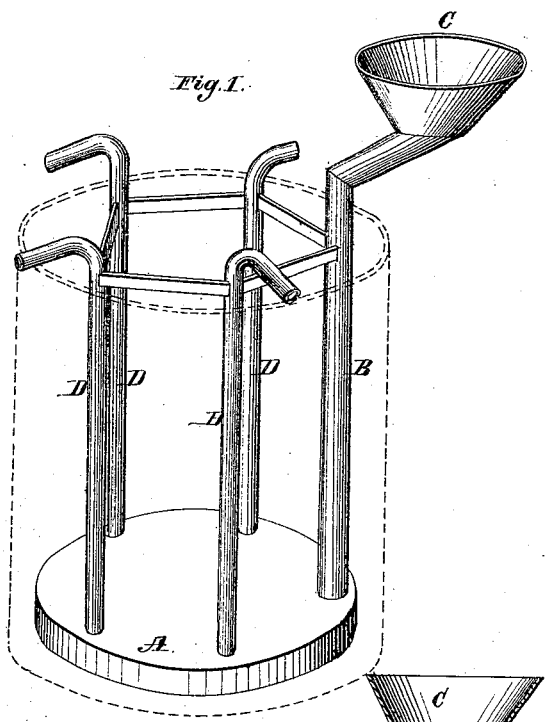
Figure 2:
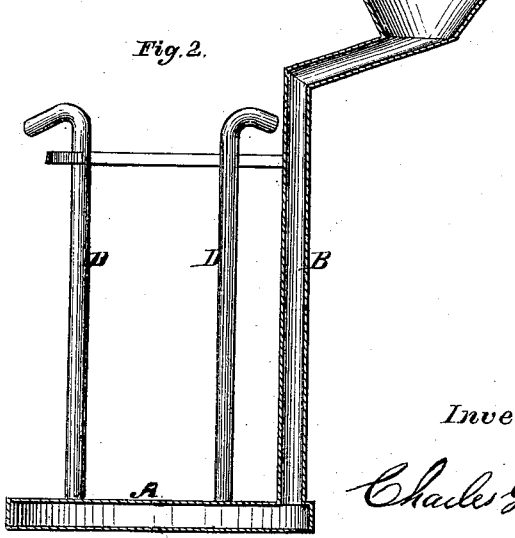

Figure 1 is a perspective view of the cooler with the can in dotted outline. Fig. 2 is a vertical section through the supply-pipe.

The reference-letters are the same in both sketches.

The object of my invention is to furnish a simply-constructed apparatus by the use of which the farmer or dairyman may have it in his power to at once deprive the night's milk of its animal heat, and aerate the same before starting it to the factory, or the better to prepare it for keeping over night, and, upon the addition of the morning-drawn milking, to again cool the entire mass before sending it off to the making room.

In the drawing, A is a shallow cylindrical vessel of sheet metal, in its diameter somewhat smaller than the interior of the carrying-can in which it is to be used, and from two to six inches in height. At one side, near the edge, rises the supply-tube B, some two inches in diameter, and in height to correspond with the can used. Near the top this tube has an angular set-off, and is provided with a funnel-shaped top, C. The tube B at the bottom opens into the vessel A.

D D D are a series of three (or there may be more) smaller discharge-tubes, situated at equidistant points around the top of the vessel A, their lower ends opening into the same, and each furnished with a top bent outward and opening downward. The entire series of tubes B D D D are securely soldered into the top of the vessel A, and are further strengthened in their position by stays, near their top, running from one to the other around the circle. Ordinarily the reservoir A is to be made of from one to two pails in capacity.

In use, the apparatus is lowered into the empty can, the whole resting upon or supported by the necks of the exit-pipes D D, resting upon the rim of the can. Sufficient ice-cold or spring water is poured, by the funnel C and tube B, into the vessel A, to fill the same. The fresh-drawn and now warm milk is strained or poured into the can. After a few minutes, more cold water is supplied to the funnel C, which, passing down into the vessel A, forces the water, now raised in temperature by the heat of the milk, up through the exit or discharge tubes D D D, the same being discharged outside the can.

The addition of cold water through the pipe B may be repeated until the entire mass of milk has been deprived of its animal heat.

For the purpose of facilitating the cooling process, and also to properly aerate the contents of the can, the vessel A may be raised to the surface of the milk and then allowed to settle back to position occasionally.

Should it be desirable to keep the milk in the can over night, the cooler may be supported at or near the surface during the time by placing slight supports under the necks of the pipes D D D, and when the morning's milking is added the cooling process is to be repeated.

When the cooling is fully accomplished, the apparatus is lifted from the can, and the water emptied through the pipe B, the tubes D D acting as vents.

What I claim as novel, and desire to secure by Letters Patent, is—

A milk-cooler for use in connection with transportation-cans, consisting of the reservoir A, funnel and supply-pipe C B, with three or more discharge-tubes, D D D, the whole arranged as shown and described.

CHARLES G. RIGGS.

Witnesses:
F. S. BUDD,
W. R. PRICHARD.